(12) United States Patent
Aufranc et al.

(10) Patent No.: US 7,970,222 B2
(45) Date of Patent: Jun. 28, 2011

(54) DETERMINING A DELAY

(75) Inventors: Richard Aufranc, Albany, OR (US);
James R. Cole, Corvallis, OR (US);
Paul S. Everest, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1645 days.

(21) Appl. No.: 11/258,739

(22) Filed: Oct. 26, 2005

(65) Prior Publication Data

US 2007/0091207 A1  Apr. 26, 2007

(51) Int. Cl.
*G06K 9/46* (2006.01)
*H04N 11/02* (2006.01)
*H04N 5/932* (2006.01)

(52) U.S. Cl. ............... 382/234; 375/240.28; 386/201

(58) Field of Classification Search .......... 382/100, 382/151, 234; 386/96, 98, 119, 201, 203; 375/240.28, E7.271; 348/192, 462, 515
See application file for complete search history.

(56) References Cited

U.S. PATENT DOCUMENTS

| | | | |
|---|---|---|---|
| 4,313,135 A | 1/1982 | Cooper | |
| 4,703,355 A | 10/1987 | Cooper | |
| 4,963,967 A * | 10/1990 | Orland et al. | 348/484 |
| RE33,535 E | 2/1991 | Cooper | |
| 5,351,090 A | 9/1994 | Nakamura | |
| 5,387,943 A * | 2/1995 | Silver | 348/512 |
| 5,570,372 A | 10/1996 | Shaffer | |
| 5,596,364 A * | 1/1997 | Wolf et al. | 348/192 |
| 5,608,697 A | 3/1997 | De Haan et al. | |
| 5,751,368 A | 5/1998 | Cooper | |
| 5,953,049 A | 9/1999 | Horn et al. | |
| 6,285,405 B1 * | 9/2001 | Binford et al. | 348/512 |
| 6,411,623 B1 * | 6/2002 | DeGollado et al. | 370/395.1 |
| 6,430,361 B2 * | 8/2002 | Lee | 386/98 |
| 6,891,573 B2 | 5/2005 | Schreiber et al. | |
| 7,020,894 B1 * | 3/2006 | Godwin et al. | 725/135 |
| 7,212,247 B2 * | 5/2007 | Albean | 348/515 |
| 7,692,724 B2 * | 4/2010 | Arora et al. | 348/515 |
| 2001/0026327 A1 | 10/2001 | Schreiber et al. | |
| 2003/0142232 A1 | 7/2003 | Albean | |
| 2003/0179317 A1 * | 9/2003 | Sigworth | 348/515 |
| 2005/0019020 A1 | 1/2005 | Sato et al. | |
| 2005/0154952 A1 | 7/2005 | Kawada et al. | |
| 2006/0127053 A1 * | 6/2006 | Lee | 386/96 |
| 2006/0139490 A1 * | 6/2006 | Fekkes et al. | 348/515 |
| 2007/0223874 A1 * | 9/2007 | Hentschel | 386/89 |
| 2008/0044160 A1 * | 2/2008 | Maegaki | 386/96 |

FOREIGN PATENT DOCUMENTS

JP  402305278 A  12/1990

* cited by examiner

*Primary Examiner* — Daniel G Mariam

(57) ABSTRACT

Embodiments for determining a delay are disclosed.

24 Claims, 3 Drawing Sheets

DETERMINING A DELAY

BACKGROUND

Audio visual (AV) systems such as televisions typically receive an AV signal that includes a video portion and an audio portion. The processing of the video portion may cause delay of the video relative to the audio. A delay caused by processing the video portion of the AV signal may cause the video and the audio to become unsynchronized. If the delay is sufficiently large, the performance of an AV system may be degraded.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As described herein, an audio delay system is provided that detects and sets audio delays associated with various types of video input signals. The audio delay system operates in a calibration mode to generate a video test signal and an audio test signal and provide the video and audio test signals to a display system and an audio system, respectively. The audio delay system determines an audio delay between video generated by the display system using the video test signal and audio generated by the audio system using the audio test signal. In a normal mode of operation, the system applies the audio delay to an audio signal to synchronize the audio from the audio system and the video from the display device.

Figure 1:
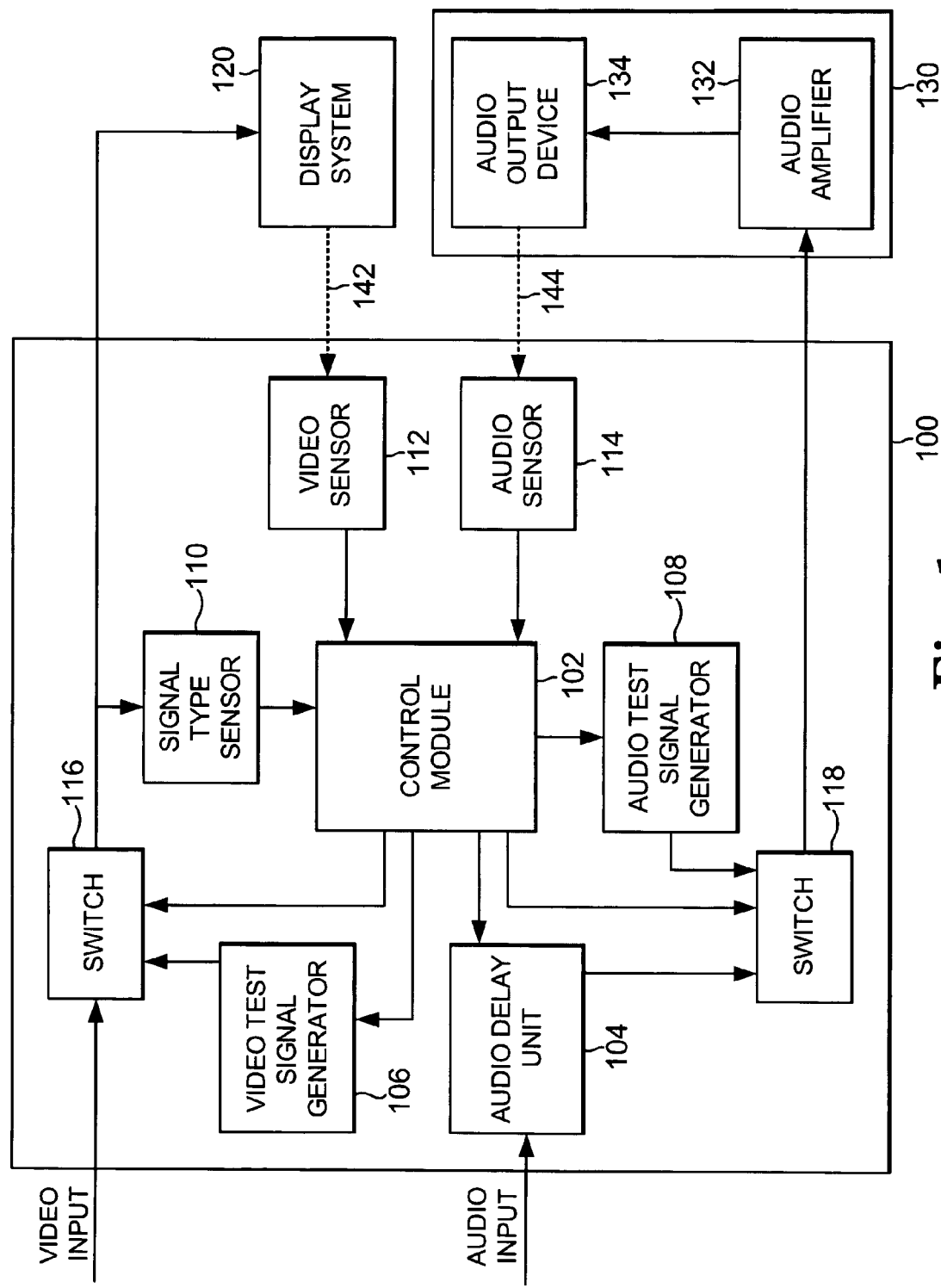
FIG. 1 is a block diagram illustrating an embodiment of an audio delay system according to one embodiment of the present disclosure.

FIG. 1 is a block diagram illustrating an embodiment of an audio delay system 100. Audio delay system 100 includes a control module 102, an audio delay unit 104, a video test signal generator 106, an audio test signal generator 108, a signal type sensor 110, a video sensor 112, an audio sensor 114, a switch 116, and a switch 118.

Audio delay system 100 receives a video input signal and an audio input signal. The video input signal and the audio input signal form the video portion and the audio portion, respectively, of an audio visual (AV) signal and may be provided to audio delay system 100 on a common connection or on separate connections. The AV signal may be any suitable type of analog or digital signal including a composite video signal, a component video signal, an S-video signal, a digital TV (DTV) signal, a high-definition TV (HDTV) signal (e.g., 480$p$, 720$p$, 1080$i$, or 1080$p$), or a high-definition multimedia interface (HDMI) signal.

Audio delay system 100 operates in at least two modes of operation: a normal mode and a calibration mode. In the normal mode of operation, audio delay system 100 provides the video input signal to a display system 120, and audio delay system 100 provides the audio input signal to an audio system 130 with an audio delay associated with the type of video input signal. In the calibration mode of operation, audio delay system 100 provides a video test signal to display system 120 and an audio test signal to audio system 130. Audio delay system 100 determines an audio delay between video 142 generated by display system 120 using the video test signal and audio 144 generated by audio system 130 using the audio test signal. Audio delay system 100 associates the audio delay with the type of video input signal and stores the audio delay for use with the type of video input signal.

Control module 102 is configured to control the operation of audio delay system 100. Control module 102 receives inputs from signal type sensor 110, video sensor 112, and audio sensor 114. The input from signal type sensor 110 indicates a type of video input signal, the input from video sensor 112 includes or is associated with video detected by video sensor 112, and the input from audio sensor includes or is associated with audio detected by audio sensor 114. Control module 102 provides control signals to audio delay unit 104, video test signal generator 106, audio test signal generator 108, switch 116, and switch 118. The control signal to audio delay unit 104 indicates the amount of audio delay to apply to the audio input signal. The control signals to video test signal generator 106 and audio test signal generator 108 cause video test signals and audio test signals, respectively, to be generated. The control signal provided to switch 116 causes either the video input signal or the video test signal to be provided to display system 120. The control signal to switch 118 causes either the audio input signal or the audio test signal to be provided to audio system 130.

Control module 102 includes an input/output (I/O) unit (not shown) configured to allow a user to control the operation of audio delay system 100 and adjust settings or parameters of audio delay system 100. The I/O unit may include devices such as buttons, switches, or knobs or one or more communication interfaces to allow information to be provided electronically from another device such as a remote control device (not shown), an audio or video component such as display system 120 or audio system 130, or a computer system (not shown).

Control module 102 includes any suitable combination of hardware and software components configured to control the operation of audio delay unit 104, video test signal generator 106, audio test signal generator 108, signal type sensor 110, video sensor 112, audio sensor 114, switch 116, and switch 118. In one embodiment, control module 102 comprises a program product (not shown), such as software or firmware, that includes instructions that are executable by a processor (not shown) to perform the functions of control module 102 described herein. The program product may be stored in any suitable media accessible to the processor.

Audio delay unit 104 receives the audio input signal and applies an audio delay to the audio input signal in accordance with the control signal provided by control module 102. In one embodiment, the audio input signal includes multiple channels. The channels may be parts of a single audio input stream, e.g., different speaker channels of a Dolby 5.1 surround sound audio input stream, or the channels may be separate audio input streams such as a Dolby 5.1 surround sound channel, a DTS channel, and other suitable audio input stream formats. Audio delay unit 104 applies one or more audio delays to the one or more channels of the audio input signal. Audio delay unit 104 provides the audio input signal with the audio delay to switch 118.

Video signal generator 106 generates a video test signal in response to receiving the control signal from control module 102. The video test signal may cause any suitable color, pattern, or sets of colors and/or patterns to be displayed on display system 120. For example, the video test signal may cause a series of solid white and solid black screens to be displayed on display system 120 at predetermined time intervals. Control module 102 causes the video test signal to be synchronized with the audio test signal. Video signal generator 106 provides the video test signal to switch 116.

Audio test signal generator 108 generates an audio test signal in response to receiving the control signal from control module 102. The audio test signal may cause any suitable tones, sounds, or sets of tones and/or sounds to be generated by audio system 130. For example, the audio test signal may cause a series of 1 kHz tones to be generated by audio system 130 at predetermined time intervals. The 1 kHz tones may be synchronized with the display of the solid white screens by display system 120 in one embodiment. Control module 102 causes the audio test signal to be synchronized with the video test signal. In one embodiment, audio test signal generator 108 sequentially generates an audio test signal for each channel of the audio input signal, e.g., for each speaker of audio system 130. By doing so, audio test signal generator 108 causes an audio delay to be determined for each audio channel for each type of video input signal. Audio signal generator 108 provides the audio test signal to switch 118.

Signal type sensor 110 receives either the video input signal or the video test signal from switch 116. Signal type sensor 110 identifies a type of the received signal. The type of signal may be any suitable type of analog or digital signal including, but not limited to, a composite video signal, a component video signal, an S-video signal, a digital TV (DTV) signal, a high-definition TV (HDTV) signal (e.g., 480*p*, 720*p*, 1080*i*, or 1080*p*), a high-definition multimedia interface (HDMI) signal, a DVI signal, a PAL signal, or a SECAM signal. The type of signal may also indicate a particular input where more than one input of the same or similar type is received by switch 116. Accordingly, signal type sensor 110 identifies the type of video input signal by the content of the video input signal and/or the particular video input signal provided by switch 116. Signal type sensor 110 provides information to control module 102 that indicates the type of the received signal.

Video sensor 112 detects video 142 displayed by display system 120 using the video signal (i.e., the video input signal or the video test signal) provided by audio delay system 100. Video sensor 112 may be any suitable video sensor that is configured to detect at least a portion (e.g., a range of color) of the video displayed by display system 120. Examples of a suitable video sensor include a photodetector and a camera. Video sensor 112 provides information to control module 102 associated with the detected video. The information may identify the presence of a type of video (e.g., a solid white screen) or may reproduce all or a portion of the video for processing by control module 102. In one embodiment, video sensor 112 includes a photodetector that is configured to detect solid white screens displayed by display system 120. In this embodiment, video sensor 112 provides information to control module 102 that identifies the presence or absence of solid white screens on display 120.

Audio sensor 114 detects audio 144 generated by audio system 130 using the audio signal (i.e., the audio input signal or the audio test signal) provided by audio delay system 100. Audio sensor 114 may be any suitable audio sensor that is configured to detect at least a portion (e.g., a range of color) of the audio generated by audio system 130. An example of a suitable audio sensor is a microphone. Audio sensor 114 provides information to control module 102 associated with the detected audio. The information may identify the presence of a type of audio (e.g., a 1 kHz tone) or may reproduce all or a portion of the audio for processing by control module 102. In one embodiment, audio sensor 114 includes a microphone that is configured to detect 1 kHz tones generated by audio system 130. In this embodiment, audio sensor 114 provides information to control module 102 that identifies the presence or absence of 1 kHz tones generated by audio system 130.

Switch 116 receives the video input signal, the video test signal from video test signal generator 106, and a control signal from control module 102. Switch 116 includes any suitable switching device configured to provide either the video input signal or the video test signal to display system 120 in response to control signal from control module 102. Switch 116 may include one or more input terminals to receive one or more types of video input signals. In addition, switch 116 may include multiplexer circuitry to select one or a set of video input signals that are of the same or similar type.

Switch 118 receives the audio input signal with audio delay from audio delay unit 104, the audio test signal from audio test signal generator 108, and a control signal from control module 102. Switch 118 includes any suitable switching device configured to provide either the video input signal or the video test signal to audio system 130 in response to control signal from control module 102.

Display system 120 receives a video signal (i.e., the video input signal or the video test signal) from audio delay system 100 and displays video 142 using the video signal. Display system 120 includes any suitable display device that is configured to generate and display video using the video signal. For example, display system 120 may include a television, a projection device, or a computer display. Display system 120 may include a cathode ray tube (CRT) display, an LCD display, a plasma display, a rear projection display, a projector, or other suitable video display technology.

Display system 120 may perform video processing on the video signal received from audio delay system 100. The video processing may cause a delay between the video displayed by display system 120 and the audio generated by audio system 130. The amount of delay may vary based on the type of video signal received by display system 120. For example, display system 120 may perform one level of processing on one type of video signal that causes one amount of delay and may perform another level of processing on another type of video signal that causes another amount of delay.

Audio system 130 receives an audio signal (i.e., the audio input signal or the audio test signal) from audio delay system 100 and generates audio 144 using the audio signal. In the embodiment shown in FIG. 1, audio system 130 includes an audio amplifier 130 configured to amplify the audio signal from audio delay system 100 and provide the amplified audio signal to an audio output device 134. Audio output device 134 generates audio, i.e., audible sounds, using the amplified audio signal. Audio system 130 includes any suitable audio device that is configured to generate audio using the audio signal. Audio output device 134 may include one or more speakers or sub-woofers, for example.

Figure 2:
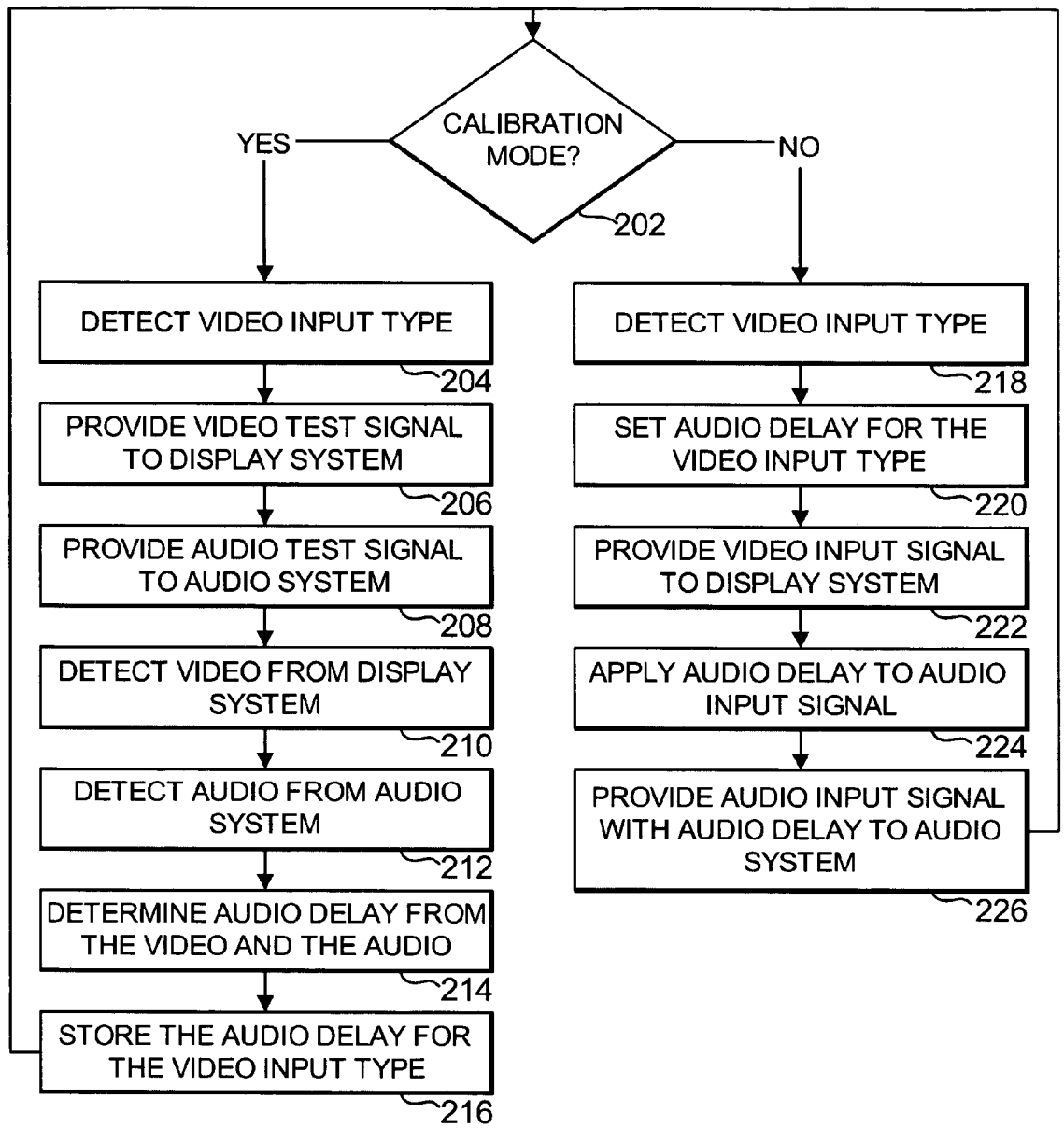
FIG. 2 is a flow chart illustrating an embodiment of a method for determining and applying audio delay in an audio delay system according to one embodiment of the present disclosure.

The operation of the embodiment shown in FIG. 1 will now be described with reference to FIG. 2. FIG. 2 is a flow chart illustrating an embodiment of a method for determining and applying audio delay in audio delay system 100.

In FIG. 2, a determination is made by audio delay system 100 as to whether to initiate a calibration mode of operation as indicated in a block 202. Audio delay system 100 may initiate a calibration mode of operation in response to any suitable conditions such as a power on or reset, a change in the type of video input signal, a preset time interval elapsing, or a user input. Control module 102 makes the determination in one embodiment.

If the calibration mode is initiated, then audio delay system 100 detects a type of video input signal as indicated in a block 204. Control module 102 detects the type of video input signal using an indicator from signal type sensor 110. As noted above, the type of video input signal may be identified by the content of the video input signal and/or the particular video input signal provided by switch 116.

Audio delay system 100 provides a video test signal to display system 120 as indicated in a block 206. Control module 102 provides a signal to video test signal generator 106 to cause the video test signal to be generated and provided to switch 116. Control module 102 provides a signal to switch 116 to cause the video test signal to be provided display system 120.

Audio delay system 100 provides an audio test signal to audio system 130 as indicated in a block 208. Control module 102 provides a signal to audio test signal generator 108 to cause the audio test signal to be generated and provided to switch 118. Control module 102 provides a signal to switch 118 to cause the audio test signal to be provided audio system 130. In one embodiment, control module 102 causes audio test signal generator 108 to generate audio test signals for each channel of the audio input signal sequentially and provide the audio test signals to switch 118 and audio system 130.

Audio delay system 100 detects video 142 from display system 120 that is generated using the video test signal as indicated in a block 210. Video sensor 112 detects video 142 and provides information associated with video 142 to control module 102. Audio delay system 100 also detects audio 144 from audio system 130 that is generated using the audio test signal as indicated in a block 212. Audio sensor 114 detects audio 144 and provides information associated with audio 144 to control module 102.

Audio delay system 100 determines an audio delay from the detected video 142 and audio 144 as indicated in a block 214. Control module 102 processes the information received from video sensor 112 and audio sensor 114 to determine the audio delay. Audio delay system 100 stores the audio delay for the type of video input as indicated in a block 216. Control module 102 associates the audio delay with the type of video input, as detected in block 204, and stores the audio delay to allow the audio delay to be used when that the type of video input is detected during the normal mode of operation. In one embodiment, control module 102 determines an audio delay for each channel of the audio input signal using the audio detected from sequentially generated audio test signals.

The method returns to repeat the function of block 202. If the calibration mode is not initiated as determined in block 202, then audio delay system 100 operates in a normal mode of operation. Audio delay system 100 detects a type of video input signal as indicated in a block 218. Control module 102 detects the type of video input signal using an indicator from signal type sensor 110. As noted above, the type of video input signal may be identified by the content of the video input signal and/or the particular video input signal provided by switch 116.

Audio delay system 100 sets an audio delay for the type of video input as indicated in a block 220. Control module 102 provides a signal to audio delay unit 104 that indicates the audio delay. In one embodiment, control module 102 also sets an audio delay for each channel of the audio input signal.

Audio delay system 100 provides the video input signal to display system 120 as indicated in a block 222. Control module 102 provides a signal to switch 116 to cause the video input signal to be provided display system 120.

Audio delay system 100 applies the audio delay to the audio input signal as indicated in a block 224. Audio delay unit 104 applies the audio delay to the audio input signal and provides the audio input signal with the delay to switch 118. In one embodiment, audio delay unit 104 applies an audio delay for each channel of the audio input signal and provides the channels of the audio input signal with the delays to switch 118.

Audio delay system 100 provides the audio input signal with the audio delay to audio system 130 as indicated in a block 226. Control module 102 provides a signal to switch 118 to cause the audio input signal with the audio delay to be provided audio system 130.

The method returns to repeat the function of block 202.

Figure 3:
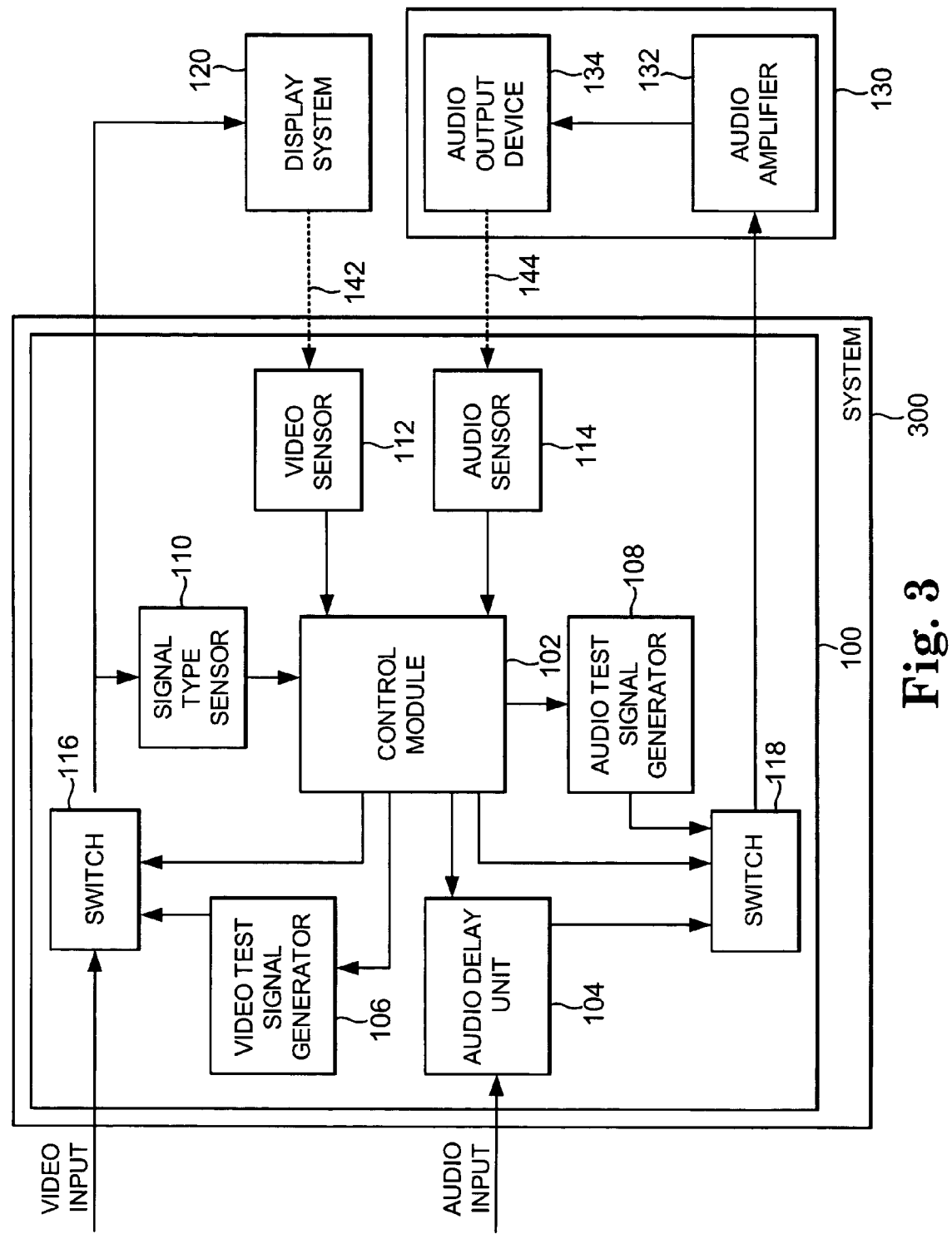
FIG. 3 is a block diagram illustrating an embodiment of a system with an audio delay system according to one embodiment of the present disclosure.

FIG. 3 is a block diagram illustrating an embodiment of a system 300 that includes audio delay system 100. System 300 is configured to perform one or more functions in addition to those performed by audio delay system 100. For example, system 300 may be an AV receiver, an AV switching box, a wireless communications transmitter, a cable extender, and/or a signal conversion unit. Audio delay system 100 operates in system 300 as described above with reference to FIGS. 1 and 2.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the optical, mechanical, electromechanical, electrical, and computer arts will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited by the claims and the equivalents thereof.

What is claimed is:

1. A system comprising:
    means for providing a video test signal to a display system;
    means for providing an audio test signal to an audio system;
    means for detecting video displayed by the display system using the video test signal;
    means for detecting audio generated by the audio system using the audio test signal;
    means for determining a delay between the video displayed by the display system using the video test signal and the audio generated by the audio system using the audio test signal;
    means for detecting a type of a video input signal; and
    means for associating the delay with the type of the video input signal.

2. The system of claim 1 further comprising:
    means for providing the video test signal to the display system during a calibration mode of operation and the video input signal to the display system subsequent to the calibration mode of operation.

3. The system of claim 2 further comprising:
means for providing the audio test signal to the audio system during the calibration mode of operation and an audio input signal to the audio system subsequent to the calibration mode of operation.

4. The system of claim 3 further comprising:
means for applying the delay to the audio input signal subsequent to the calibration mode of operation.

5. The system of claim 1 further comprising:
means for applying the delay to an audio input signal provided to the audio system.

6. The system of claim 1 further comprising:
means for storing the delay.

7. The system of claim 1 further comprising:
means for generating the video test signal; and
means for generating the audio test signal.

8. A method comprising:
providing a video test signal to a display system;
providing an audio test signal to an audio system;
detecting video displayed by the display system using the video test signal;
detecting audio generated by the audio system using the audio test signal;
determining a delay between the video displayed by the display system using the video test signal and the audio generated by the audio system using the audio test signal;
detecting a type of a video input signal;
associating the delay with the type of the video input signal;
providing the video input signal to the display system;
applying the delay to an audio input signal; and
providing the audio input signal to the audio system subsequent to applying the delay.

9. The method of claim 8 further comprising:
storing the delay.

10. The method of claim 8 further comprising:
generating the video test signal; and
generating the audio test signal.

11. A system comprising:
a display system;
an audio system; and
an audio delay system configured to provide a video test signal to the display system, provide a first audio test signal to an audio system, detect video displayed by the display system using the video test signal, detect first audio generated by the audio system using the first audio test signal, and determine a first delay between the video displayed by the display system using the video test signal and the first audio generated by the audio system using the first audio test signal;
wherein the audio delay system is configured to detect a type of a video input signal, and wherein the audio delay system is configured to associate the delay with the type of the video input signal.

12. The system of claim 11 wherein the first audio test signal corresponds to a first channel of an audio input signal, wherein the audio delay system is configured to provide a second audio test signal that corresponds to a second channel of the audio input signal to the audio system, and wherein the audio delay system is configured to determine a second delay between the video generated by the display system using the video test signal and second audio generated by the audio system using the second audio test signal.

13. The system of claim 11 wherein the audio delay system is configured to provide the video test signal to the display system during a calibration mode of operation and the video input signal to the display system subsequent to the calibration mode of operation.

14. The system of claim 13 wherein the audio delay system is configured to provide the first audio test signal to the audio system during the calibration mode of operation and an audio input signal to the audio system subsequent to the calibration mode of operation.

15. The system of claim 14 wherein the audio delay system is configured to apply the first delay to the audio input signal subsequent to the calibration mode of operation.

16. The system of claim 11 wherein the audio delay system is configured to apply the first delay to an audio input signal provided to the audio system.

17. An apparatus comprising:
a video test signal generator configured to provide a video test signal to a display system;
an audio test signal generator configured to provide an audio test signal to an audio system;
a video sensor configured to detect video displayed by the display system using the video test signal;
an audio sensor configured to detect audio generated by the audio system using the audio test signal; and
a control module configured to determine a delay between the video displayed by the display system using the video test signal and the audio generated by the audio system using the audio test signal; and
a signal type sensor configured to detect a type of a video input signal;
wherein the control module is configured to associate the delay with the type of the video input signal.

18. The apparatus of claim 17 further comprising:
a first switch configured to provide the video test signal to the display system during a calibration mode of operation and the video input signal to the display system subsequent to the calibration mode of operation in response to a first signal from the control module.

19. The apparatus of claim 18 further comprising:
a second switch configured to provide the audio test signal to the audio system during the calibration mode of operation and an audio input signal to the audio system subsequent to the calibration mode of operation in response to a second signal from the control module.

20. The apparatus of claim 17 further comprising:
an audio delay unit configured to apply the delay to an audio input signal provided to the audio system.

21. A program product stored on a non-transitory computer-readable medium and having instructions for causing a control module to execute a method comprising:
causing a video test signal to be provided to a display system;
causing an audio test signal to be provided to an audio system;
receiving first information from a video sensor associated with video displayed by the display system using the video test signal and detected by the video sensor;
receiving second information from an audio sensor associated with to audio generated by the audio system using the audio test signal and detected by the audio sensor;
determining a delay between video displayed by the display system using the video test signal and the audio generated by the audio system using the audio test signal using the first information and the second information; and
receiving third information from a signal type sensor that indicates a type of a video input signal; and associating the delay with the type of the video input signal.

22. The program product of claim 21 having instructions for causing the control module to execute the method further comprising:
  causing the video test signal to be provided the display system during a calibration mode of operation and the video input signal to the display system subsequent to the calibration mode of operation.

23. The program product of claim 22 having instructions for causing the control module to execute the method further comprising:
  causing the audio test signal to be provided to the audio system during the calibration mode of operation and an audio input signal to the audio system subsequent to the calibration mode of operation.

24. The program product of claim 23 having instructions for causing the control module to execute the method further comprising:
  causing the delay to be applied to the audio input signal subsequent to the calibration mode of operation.

* * * * *

UNITED STATES PATENT AND TRADEMARK OFFICE
CERTIFICATE OF CORRECTION

| | | |
|---|---|---|
| PATENT NO. | : 7,970,222 B2 | Page 1 of 1 |
| APPLICATION NO. | : 11/258739 | |
| DATED | : June 28, 2011 | |
| INVENTOR(S) | : Richard Aufranc et al. | |

It is certified that error appears in the above-identified patent and that said Letters Patent is hereby corrected as shown below:

In column 8, line 24, in Claim 17, delete "system the" and insert -- system using the --, therefor.

In column 8, line 59, in Claim 21, delete "with to" and insert -- with --, therefor.

Signed and Sealed this
Seventeenth Day of July, 2012

David J. Kappos
*Director of the United States Patent and Trademark Office*